US009400325B2

(12) United States Patent
Millar (10) Patent No.: US 9,400,325 B2
(45) Date of Patent: Jul. 26, 2016

(54) METHOD AND APPARATUS FOR INCREASING ANGULAR RESOLUTION IN AN AUTOMOTIVE RADAR SYSTEM

(71) Applicant: Valeo Radar Systems, Inc., Hudson, NH (US)

(72) Inventor: Jeffrey Millar, Mount Vernon, NH (US)

(73) Assignee: Valeo Radar Systems, Inc., Hudson, NH (US)

( * ) Notice: Subject to any disclaimer, the term of this patent is extended or adjusted under 35 U.S.C. 154(b) by 0 days.

(21) Appl. No.: 14/953,929

(22) Filed: Nov. 30, 2015

(65) Prior Publication Data

US 2016/0146925 A1     May 26, 2016

Related U.S. Application Data

(63) Continuation-in-part of application No. 14/554,224, filed on Nov. 26, 2014.

(51) Int. Cl.
| | | |
|---|---|---|
| G01S 13/42 | (2006.01) | |
| G01S 7/42 | (2006.01) | |
| H04B 7/08 | (2006.01) | |
| G01S 13/58 | (2006.01) | |
| G01S 7/35 | (2006.01) | |

(52) U.S. Cl.
CPC . *G01S 7/42* (2013.01); *G01S 7/352* (2013.01); *G01S 13/583* (2013.01); *H04B 7/0891* (2013.01); *G01S 2007/356* (2013.01)

(58) Field of Classification Search
CPC ......... G01S 7/42; G01S 7/352; G01S 13/583; G01S 2007/356; G01S 13/584; G01S 2013/9375; G01S 2013/9385; G01S 13/42; G01S 2013/9332; G01S 2013/9378; G01S 2013/9389; G01S 7/354; H04B 7/0891

USPC .............. 342/113, 70–72, 102, 107–108, 342/116–117, 196
See application file for complete search history.

(56) References Cited

U.S. PATENT DOCUMENTS

| | | | | |
|---|---|---|---|---|
| 3,952,303 | A * | 4/1976 | Watanabe | G01S 13/24 342/112 |
| 4,825,213 | A | 4/1989 | Smrek | |
| 5,334,984 | A | 8/1994 | Akaba | |
| 5,579,011 | A | 11/1996 | Smrek | |
| 6,337,656 | B1 | 1/2002 | Natsume et al. | |
| 6,366,236 | B1 * | 4/2002 | Farmer | G01S 7/417 342/118 |
| 7,265,675 | B1 * | 9/2007 | Carrender | G06K 7/10356 340/10.1 |
| 8,054,216 | B2 | 11/2011 | Kinoshita et al. | |

(Continued)

FOREIGN PATENT DOCUMENTS

| | | | | |
|---|---|---|---|---|
| DE | 102012021212 A1 * | 4/2014 | | G01S 7/023 |
| EP | 0 766 100 A1 | 4/1997 | | |
| GB | 2462148 A * | 2/2010 | | G01S 7/023 |

OTHER PUBLICATIONS

PCT International Search Report and Written Opinion dated Mar. 3, 2016 corresponding to PCT International Application No. PCT/US2015/062378; 12 pages.

*Primary Examiner* — John B Sotomayor
(74) *Attorney, Agent, or Firm* — Daly, Crowley, Mofford & Durkee, LLP (57) ABSTRACT

Described herein is an automotive radar system and related processing techniques utilizing a three channel switched antenna to improve the angular resolution of an azimuth tracking radar.

8 Claims, 11 Drawing Sheets

(56) References Cited

U.S. PATENT DOCUMENTS

| | | |
|---|---|---|
| 9,229,102 B1 | 1/2016 | Wright et al. |
| 2005/0156780 A1* | 7/2005 | Bonthron .............. G01S 13/343 342/107 |
| 2008/0018523 A1* | 1/2008 | Kelly, Jr. ................. G01S 7/354 342/70 |
| 2010/0271258 A1* | 10/2010 | Takabayashi ......... G01S 13/931 342/107 |
| 2012/0313811 A1 | 12/2012 | Suzuki |
| 2015/0070207 A1* | 3/2015 | Millar ................... G01S 13/006 342/174 |
| 2015/0323660 A1* | 11/2015 | Hampikian ............. G01S 13/58 342/109 |
| 2016/0033620 A1* | 2/2016 | Millar .................... G01S 7/282 342/195 |
| 2016/0061947 A1* | 3/2016 | Patole .................... G01S 13/34 342/109 |

\* cited by examiner

FIG. 1

(PRIOR ART)

METHOD AND APPARATUS FOR INCREASING ANGULAR RESOLUTION IN AN AUTOMOTIVE RADAR SYSTEM

CROSS REFERENCE TO RELATED APPLICATION

This application is a continuation-in-part of co-pending U.S. application Ser. No. 14/554,224 filed Nov. 26, 2014, which application is incorporated herein by reference in its entirety.

FIELD

The concepts, systems, circuits, devices and techniques described herein relate generally to radio frequency (RF) circuits and more particularly to automotive radar systems.

BACKGROUND

As is known in the art, some existing automotive radar systems detect targets which produce a radar return signal having a signal strength which exceeds a threshold signal strength in range/Doppler space. The radar then develops an estimate of X-Y position and velocity for each target. This approach typically requires algorithms in the form of state machines and tracking with thresholds and heuristics.

Figure 1:
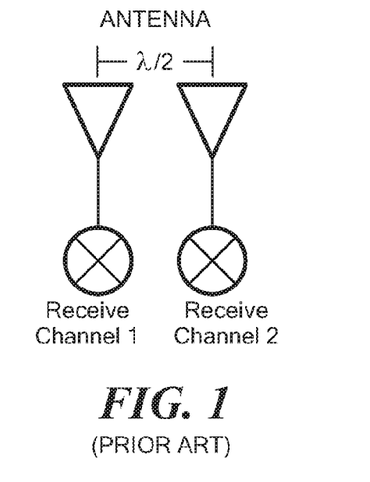
FIG. 1 is a block diagram of a prior art two-channel automotive radar system.
Figure 1A:
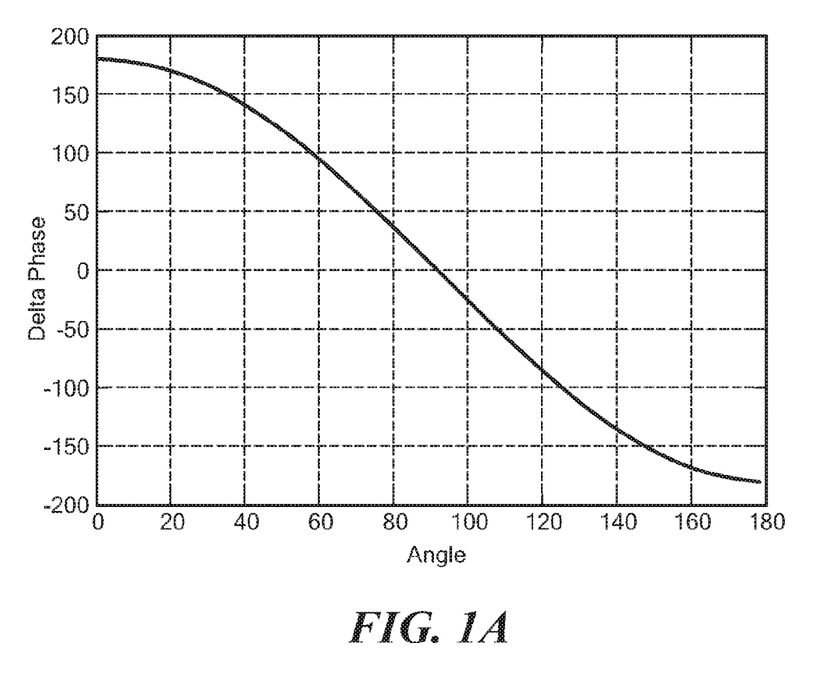
FIG. 1A is a plot of ideal phase difference vs. angle for the two-channel automotive radar system of FIG. 1.

Referring to FIGS. 1-1A, some conventional automotive radar systems use two antennas, each feeding one channel of a two-channel receiver. As illustrated in FIG. 1A, the phase difference between the signals in the two channels provides angle information which can be used to detect targets in an azimuth plane. An antenna spacing of one-half wavelength ($\lambda/2$) theoretically enables such a two-channel automotive radar system to provide unambiguous angle information over a 180° field of view (FOV).

SUMMARY

Some automotive radar systems, however, use relatively small and inexpensive antennas and other components. This is due both to cost considerations and size constraints. Such constraints in the antenna lead to a problem with antenna quality and antenna interaction with a body of a vehicle on which an automotive radar system is mounted. In particular, and in accordance with the concepts, systems and techniques described herein, it has been recognized that the use of relatively small and inexpensive antennas results in a complex phase relationship between azimuth and phase difference in an automotive radar system.

Figure 1B:
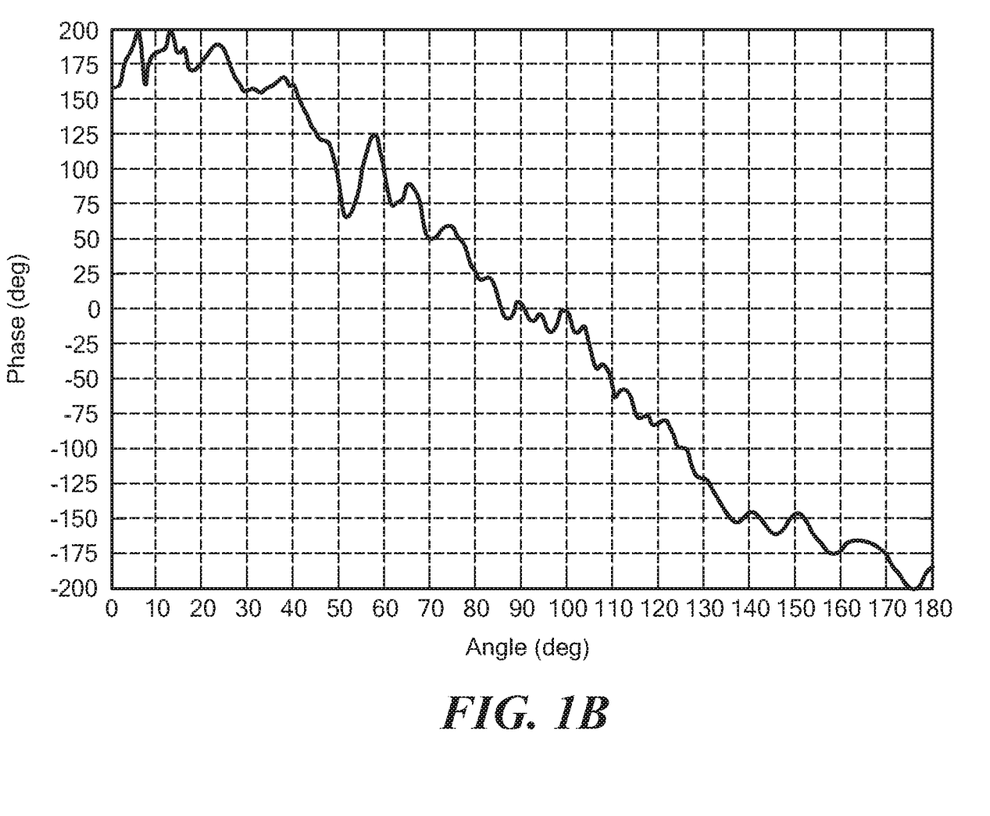
FIG. 1B is a plot of measured phase difference vs. angle for the two-channel automotive radar system of FIG. 1.

It has also been recognized that conventional two-channel automotive radar systems (also referred to as two channel automotive "sensor" systems) generate ambiguities which cannot be easily resolved. Specifically, as illustrated in FIG. 1B, the limitations of conventional two-channel automotive radar systems (i.e. utilizing two antennas spaced by $\lambda/2$ with each antenna feeding one channel of a 2-channel receiver) in real world applications become clear. In real world applications in a conventional two-channel automotive radar system, interactions of radio frequency (RF) energy with the antenna surroundings results in ripple in a phase response of the automotive radar system. Automotive fascia, brackets, vehicle body and other structure and factors all can contribute to such phase ripple. Furthermore the radar's small size contributes to phase distortion due to the edge of the antenna and radar enclosure occurring at locations having significant RF energy. Thus, as illustrated in FIG. 1B, a resulting phase curve in a real world system has regions (e.g., between approximately 50 and 60 degrees in FIG. 1B) were the angular resolution is such that ambiguities exist and thus the angular resolution is not acceptable.

In accordance with one aspect of the concepts, systems and techniques described herein, it has been found that the above problem may be solved in a two-channel automotive radar system by adding a third antenna. Thus, described herein is an automotive radar system which utilizes a three channel switched antenna to improve the angular resolution of an azimuth tracking two-channel automotive radar system having a wide (i.e. field of view greater than above approximately 145 or 150 degrees). It should, of course, be appreciated that the concepts and techniques described herein also find application in systems having a narrow field of view (FOV)—i.e. a FOV less than approximately 150 degrees—although a narrow field of view requirement might allow an antenna design having attenuated RF energy propagating at 0 and 180 degrees and thus reduce the number and severity of problems when RF the energy interacts with a structure proximate the antenna including, but not limited to, for example an edge of the antenna board, an enclosure frame, and/or a vehicle body.

Specifically, in a two-channel automotive radar system, a first antenna is spaced from a second antenna by a distance of $\lambda/2$ and a third antenna is spaced from the second antenna by a distance of $\lambda$ and is spaced from the first antenna by a distance of $3\lambda/2$. The first antenna is coupled to a first channel of the two-channel receiver and the second and third antennas (with the second antenna spaced $\lambda/2$ from the first antenna and the third antenna being spaced $3\lambda/2$ from the first antenna) are selectively coupled to the second receiver channel through a switch. Thus, signals received from two separate antennas share one channel of the two-channel receiver.

With this particular arrangement, a two-channel automotive radar system having an angular resolution which does not result in ambiguities is provided. In particular, by providing a two-channel automotive radar system having three appropriately spaced antennas and with two of the antennas selectively sharing a single channel, the two-channel automotive radar system can generate two (2) different phase curves with a first one of the phase curves corresponding to an unambiguous phase curve (substantially the same as that provided in a conventional two-channel system with $\lambda/2$ antenna spacing) and a second one of the two phase curves corresponding to a phase curve having a slope which is different than the slope of the first phase curve (e.g. a phase curve generated by using $\lambda/2$ antenna spacing).

The advantages to using such a system include, but are not limited to: (1) that the $3\lambda/2$ phase curve has higher azimuth angle resolution; (2) the $\lambda/2$ phase curve is used to resolve the ambiguities in the $3\lambda/2$ phase curve; (3) the system of less sensitive to placement and mounting (lower effective ripple); and (4) the system provided better field of view (FOV) performance.

In accordance with a further aspect of the concepts, systems and techniques described herein, an automotive radar system comprises three receive antennas with a first antenna is spaced from a second antenna by a distance of $\lambda/2$ and a third antenna is spaced from the second antenna by a distance of $\lambda$ and spaced from the first antenna by a distance of $3\lambda/2$. Each of the three antenna are coupled to one of three channels in a radio frequency (RF) receiver. Thus, each receiver channel has an input coupled to a respective one of three antennas.

With this particular arrangement, a three-channel automotive radar system is provided having an angular resolution which does not result in ambiguities. In particular, by providing a three-channel automotive radar system having three appropriately spaced antennas, the three-channel automotive radar system can generate two (2) different phase curves with a first one of the phase curves corresponding to an unambiguous phase curve (substantially the same as that provided in a conventional two-channel system with $\lambda/2$ antenna spacing) and a second one of the two phase curves corresponding to a phase curve having a slope which is different than the slope of the first phase curve (e.g. a phase curve generated by using $3\lambda/2$ antenna spacing).

The advantages to using such a system include, but are not limited to: (1) that the $3\lambda/2$ phase curve has higher azimuth angle resolution; (2) the $\lambda/2$ phase curve is used to resolve the ambiguities in the $3\lambda/2$ phase curve; (3) the system is less sensitive to placement and mounting (lower effective ripple); and (4) the system provides better field of view (FOV) performance because the radar has less need to attenuate energy towards the 0 and 180 degree directions.

In accordance with another aspect of the disclosure, an automotive radar system comprises: three or more receive antennas; a radio frequency (RF) switch having a three or more input ports coupled to respective ones of the receive antennas, and an output port; a single-channel RF receiver having an input port coupled to the output of the RF switch to selectively receive RF signals from the receive antennas, and having an output port; and a single-channel intermediate frequency (IF) receiver having an input port coupled to the output port of the RF receiver, wherein the IF receiver is configured to, in response to transmitted chirps reflected off a target, receive interleaved chirp return signals from the receive antennas and to determine an azimuth angle to the target and a Doppler velocity of the target using the interleaved chirp return signals.

In accordance with yet another aspect of the disclosure, an automotive radar system comprises: three or more receive antennas; a radio frequency (RF) receiver having three or more channels, each of the receiver channels having an input port coupled to a respective one of the receive antennas, and an output port; an intermediate frequency (IF) switch having three or more input ports coupled to respective ones of the RF receiver channel output ports, and having an output port; a single-channel IF receiver having an input port coupled to the output port of the IF switch to selective receive IF signals from the RF receiver channels, wherein the IF receiver is configured to, in response to transmitted chirps reflected off a target, receive interleaved return signals from the receive antennas and to determine an azimuth angle to the target and a Doppler velocity of the target using the interleaved return signals.

In some embodiments, the single-channel IF receiver is configured to: convert interleaved chirp return signals collected over a major cycle into a set of time-domain samples; for each of the receive antennas, use a 2D Fast Fourier Transform (FFT) to convert the time-domain samples to the frequency domain to obtain magnitude and phase to target in each range/Doppler bin; for each receive antenna, correct the phase to target in each range/Doppler bin based, at least in part, upon the position of the receive antenna; and determine azimuth angle to the target and a Doppler velocity of the target based upon the corrected phase to target in each range/Doppler bin.

In certain embodiments, the receive antennas comprise: a first receive antenna; a second receive antenna spaced by a distance of in the range of about $0.4\lambda$ to about $0.5\lambda$ from the first antenna; and a third receive antenna spaced from the second antenna by a distance of about $\lambda$ and spaced from the first antenna by a distance in the range of about $1.4\lambda$ to about $1.7\lambda$. In some embodiments, the radar system comprises at least four receive antennas.

The concepts, structures and techniques described herein can benefit any 24 GHz radar, especially those using wide field of view (FOV) antenna designs. Furthermore, the concepts, structures and techniques described herein can be used in a wide variety of applications including, but not limited to blind spot detection, lane change, CTA, and park slot measurement.

It should be noted that individual concepts, features (or elements) and techniques of different embodiments described above may be combined to form other embodiments not specifically set forth herein. Furthermore, various concepts, features (or elements) and techniques, which are described in a combination, may also be provided separately or in any suitable sub-combination. It is thus expected that other embodiments not specifically described herein are also within the scope of this disclosure.

BRIEF DESCRIPTION OF THE DRAWINGS

The foregoing and other aspects, features and advantages of the concepts described herein will be apparent from the following description of particular embodiments, as illustrated in the accompanying drawings in which like reference characters refer to the same parts throughout the different views. The drawings are not necessarily to scale, emphasis instead being placed upon illustrating the principles of the disclosure.

DETAILED DESCRIPTION

Described herein is an automotive radar system (also sometime referred to herein as an automotive sensor system) and techniques suitable for providing unambiguous phase information for locating a target. The techniques described herein are suitable for use with a frequency modulated continuous wave (FMCW) automotive radar system, however, it should be appreciated that the systems and techniques described herein also may be used in non-FMCW automotive radars as well as in radars other than automotive radars.

Figure 2:
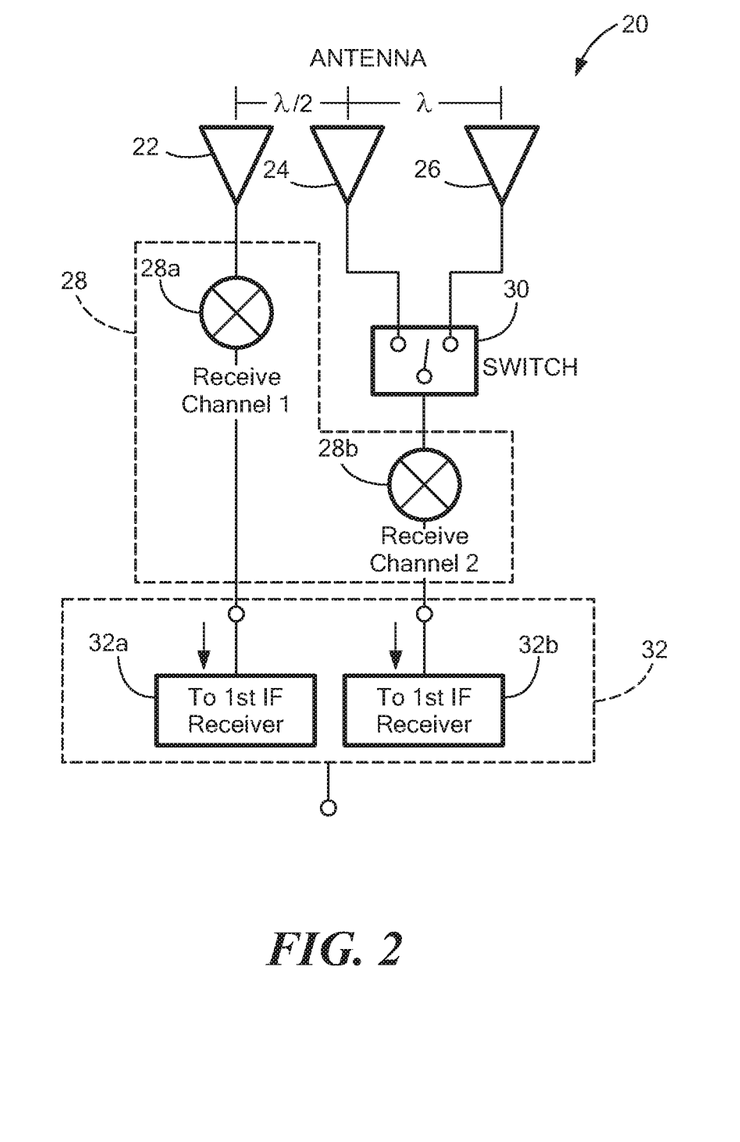
FIG. 2 is a block diagram of an automotive radar system which utilizes a three channel switched antenna.

Referring now to FIG. 2, an automotive radar system 20 which utilizes a three channel switched antenna to improve the angular resolution of an azimuth tracking two-channel automotive radar system includes a first antenna 22 spaced from a second antenna 24 by a distance of $\lambda/2$ and a third antenna 26 spaced from the second antenna 24 by a distance of $\lambda$ and spaced from the first antenna by a distance of $3\lambda/2$. The first antenna 22 is coupled to a first radio frequency (RF) receiver channel 28a of a two-channel RF receiver 28. In the example system of FIG. 2, receiver channel 28a is illustrated as a single RF downconverter. Those of ordinary skill in the art will appreciate, of course, that receiver channel 28a may include a significant number of other components as is generally known (e.g. a low noise amplifier).

The second and third antennas 24, 26 are selectively coupled to the second receiver channel 28b through an RF switch 28. Thus, in the example system of FIG. 2, signals received from two separate antennas (i.e. antennas 24, 26) share one channel (i.e. channel 28b) of the two-channel receiver 28.

As noted above, those of ordinary skill in the art will appreciate that receiver channel 28b may include a significant number of other components as is generally known (e.g. a low noise amplifier). It should also be appreciated that switch 30 is not shown as being a proper part of RF receiver 28. After reading the description provided herein, however, those of ordinary skill in the art will appreciate that switch 30 may be provided as a component separate from receiver 28 or may be provided as part of receiver 28. Furthermore, in some applications, switch 30 may even be provided as part of the RF receiver channel 28b.

Receiver channels 28a, 28b, receive RF signals provide thereto from respective ones of antennas 22-26 and downconvert the signals to a first intermediate frequency for further processing by respective ones of intermediate frequency (IF) receiver channels 32a, 32b.

Significantly, processing of the RF signals through receiver channels 28a, 28b and switch 30 retains the relative phase information associated with the signals received through the respective antennas 22-26. The preferred results are achieved when ambiguity resolution of $3\lambda/2$ is done when the scene is the same as when measured by the $\lambda/2$ spacing. So preferred designs use alternating $\lambda/2$ and $3\lambda/2$ spacing as rapidly as possible. The switching frequency is selected to provide the most up to date ambiguity timing of ambiguity resolution. In an automotive radar system utilizing major and minor processing cycles such as that described in U.S. Pat. No. 6,707, 419 B2 assigned to the assignee of the present application and incorporated herein by reference, for a 40 millisecond (ms) major cycle, 80 ms is used for each $3\lambda/2$ antenna, and 80 ms for each $\lambda/2$ antenna.

IF receivers 32a, 32b process the signals fed thereto from respective RF receiver channels 28a, 28b. Such processing may include conversion of analog signals to digital signals.

As noted above, RF receiver channel 32b receives signals from both antenna 24 and antenna 26. Since the spacing between antenna 22 and antenna 24 is different than the spacing between antenna 22 and antenna 26, by switching between the two antennas, the system generates two (2) different phase curves.

A phase curve is the measured relationship between measured phase difference and actual azimuth angle. Each antenna pair (e.g. antennas 22, 24 as a pair or antennas 22, 26 as a pair) has a unique relationship or phase curve. Assuming a 40 ms major cycle time and a relatively stationary radar scene over 80 ms, for example, one phase curve can be used to resolve the ambiguity of the other. Both phase difference measurements have useful information about the target. The relationship between signal to noise ratio and azimuth error can be used to weight the contribution of the $\lambda/2$ phase curve to the net azimuth estimate.

Figure 2A:
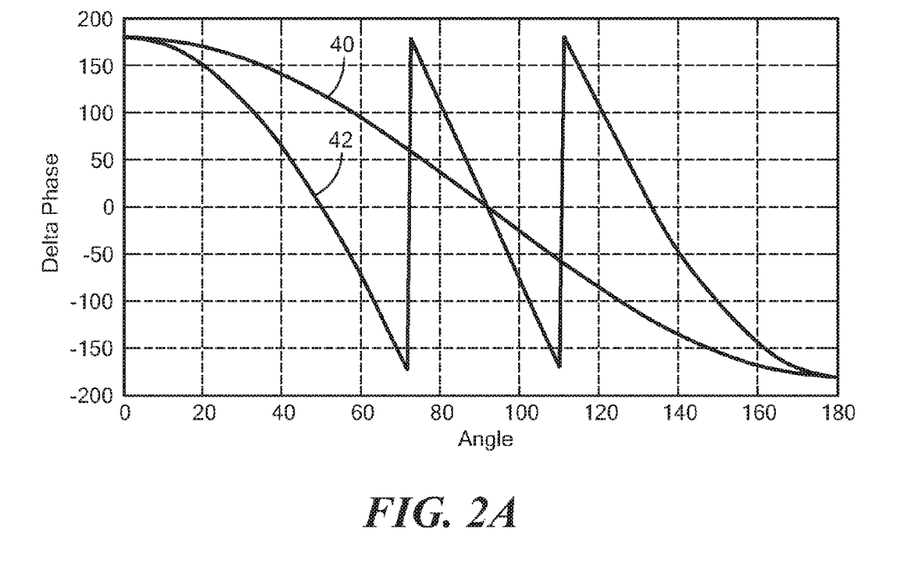
FIG. 2A is plot of ideal phase difference vs. angle for an automotive radar system which utilizes a three channel switched antenna which may be the same as or similar to the system described in conjunction with FIG. 2.

Regardless of whether analog processing, digital processing or a combination of analog and digital processing is used, however, such processing in receiver 32 generates two (2) different phase curves such as those illustrated in FIG. 2A. It should be appreciated that in some applications utilizing four (4) or more antennas, for example, it may be advantageous to utilize more than two phase curves. For example, it may be desirable for an automotive radar system to utilize four (4) antennas with simultaneous processing with three or more phase curves.

Referring now to FIG. 2A, a first one of the phase curves 40 corresponds to an unambiguous phase curve and a second one of the two phase curves 42 corresponds to a phase curve having a slope which is different than the slope of the first phase curve. In this illustrative example, the first phase curve 40 (i.e. unambiguous phase curve) is generated by using signals from the antennas spaced by $\lambda/2$ (e.g. such as that provided by antennas 22 and 24 of FIG. 2). It should be noted that the unambiguous phase curve substantially corresponds to the same phase curve as would be provided by a conventional two-channel system with $\lambda/2$ antenna spacing (such as the system of FIG. 1, for example). The second phase curve 42 is generated by using a pair of antenna spaced by $3\lambda/2$ (e.g. such as that provided by antennas 22 and 26 of FIG. 2). Since the phase curves 40, 42 have different slopes, the use of the two phase curves 40, 42 enables the system to provide unambiguous angle information over a 180° field of view (FOV).

Specifically, phase curve 42 (generated by the $3\lambda/2$ antenna spacing) has an azimuth angle resolution which is higher than phase curve 40. It should, of course be noted that phase curve 42 may itself, have ambiguities, Thus, phase curve 40 (generated by $\lambda/2$ antenna spacing) may be used to resolve ambiguities in the $3\lambda/2$ phase curve.

It has been found that utilizing two or more phase curves with at least one phase curve having a slope which is different from the slope of another phase curve, an automotive radar system which is less sensitive to physical placement and mounting (lower effective ripple) on a vehicle than conventional systems is provided. It should be noted that a spacing of $3\lambda/2$ produces three (3) times the slope of the $\lambda/2$ spacing. In addition, an effect related to the wider antenna spacing may result in the antenna being in a less coherent phase environment for reflections from the body. It has been found that utilizing two or more phase curves with at least one phase curve having a slope which is different from the slope of another phase curve, an automotive radar system which having better FOV performance is provided.

Figure 2B:
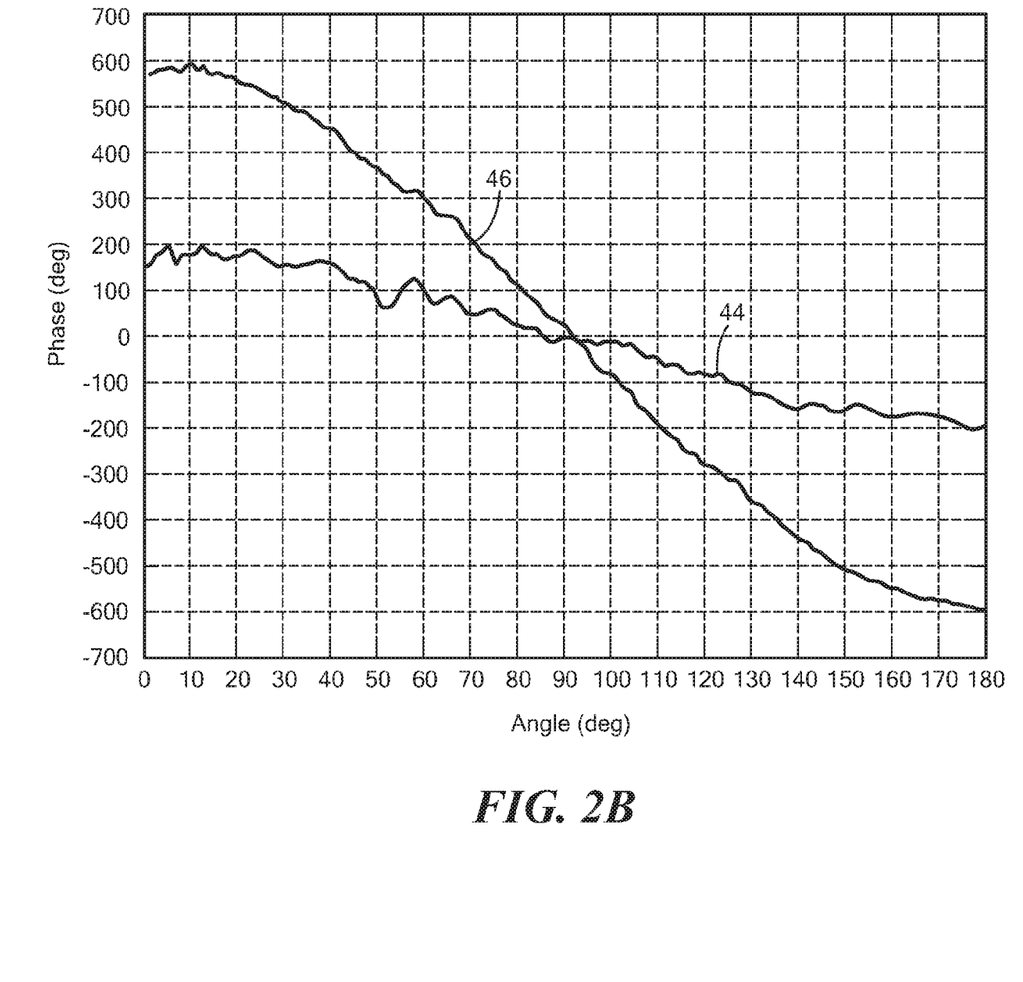
FIG. 2B is plot of measured phase difference vs. angle for a vehicle-mounted automotive radar system which utilizes a three channel switched antenna which may be the same as or similar to the system described in conjunction with FIG. 2.

Referring now to FIG. 2B, phase curves generated from measurements made in a vehicle-mounted automotive radar system are shown. Phase curve 44 corresponds to an unambiguous phase curve (i.e. phase curve generated with $\lambda/2$ antenna spacing) and phase curve 46 corresponds to a phase curve generated with $3\lambda/2$ antenna spacing (it should be noted that phase curve 46 is "unwrapped").

Figure 3:
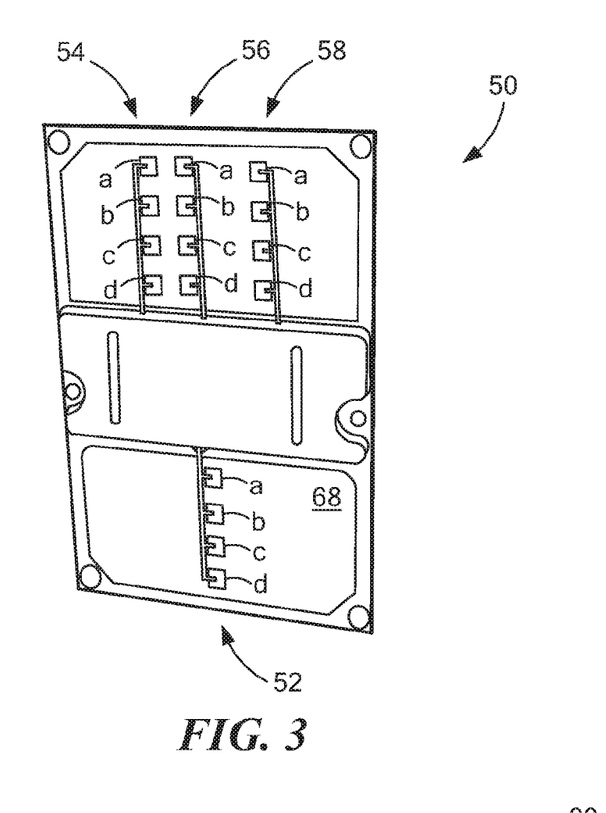
FIG. 3 is a perspective view of an automotive radar system which utilizes a three channel switched antenna which may be the same as or similar to the system shown in FIG. 2.

Referring now to FIG. 3, an automotive radar system 50 includes a transmit antenna, here provided from a linear array 52 of patch antenna elements 52a-52d. Radar system 50 also includes a receive antenna, here provided from three antennas 54, 56, 58. Significantly, antenna 54 is spaced from antenna 56 by a distance of λ/2 and antenna 58 is spaced from antenna 56 by a distance of λ and spaced from antenna 54 by a distance of 3λ/2.

In the illustrative embodiment of FIG. 3, each antenna 54, 56, 58 is shown provided as a linear array of patch antenna elements 54a-54d, 56a-56d, 58a-58d. It should, of course, be appreciated that antennas 54, 56, 58 need not be provided as array antennas for operation as a three channel switched antenna automotive radar system as described herein in conjunction with FIGS. 2-2B. It should also be appreciated that in the case where one or all of antennas 54, 56, 58 are provided as array antennas, they need not be provided as linear array antennas (e.g. one or all of antennas 54, 56, 58 may be provided as two-dimensional array antennas). Furthermore, the arrays may be provided from any type and number of antenna elements (i.e. any type of antenna element, including but not limited to patch antenna elements, may be used).

Thus, automotive radar system 50 utilizes a three channel switched antenna to improve the angular resolution of the system 50. Accordingly, automotive radar system 50 may operate as described above in conjunction with FIGS. 2-2B.

Figure 4:
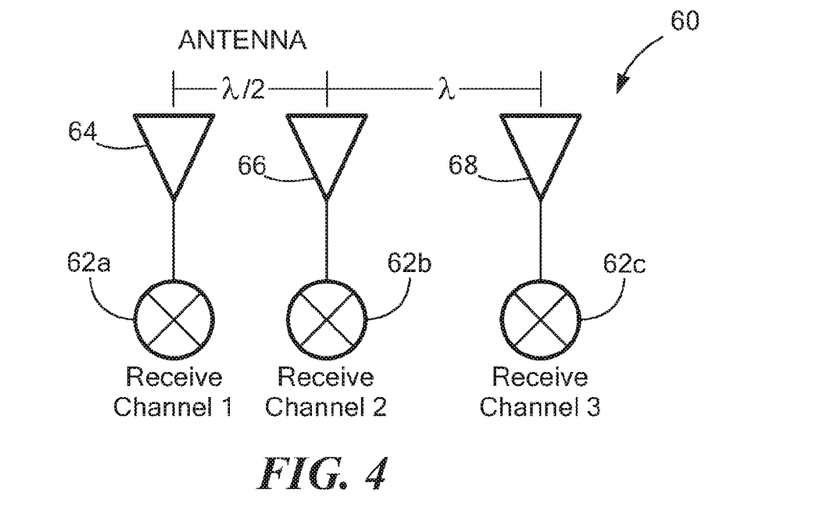
FIG. 4 is a block diagram of an automotive radar system having a three-channel receiver.

Referring now to FIG. 4, another embodiment of an automotive radar system which can achieve the same or similar results as the system described above in conjunction with FIG. 2 may use a receiver 60 having three or more channels 62a, 62b, 62c in place of the switched second channel as described above in conjunction with FIG. 2. Each receiver channel 62a, 62b, 62c receives signals from a respective one of antennas 64, 66, 68. This approach has the possibility of simultaneously processing the added channels, but with added cost.

The automotive radar systems and related techniques described above in conjunction with FIGS. 1-4 compare measurements taken simultaneously from multiple different antennas. Three or more antennas may be used to provide high resolution and to resolve ambiguity. Because a radar system requires separate RF and IF hardware for each receive antenna being used simultaneously, various embodiments described above in conjunction with FIGS. 1-4 utilize an RF switch to switch between pairs of three receive antennas. Assuming a 40 ms major cycle time and a relatively stationary radar scene over 80 ms, for example, ambiguity can be resolved by taking measurements from alternating pairs of receive antennas. Major cycle time refers to the time required to receive a predetermined number of received signals (i.e. measurements) via each antenna.

It is appreciated herein that switching every 40 ms may allow the scene to change enough to degrade the ability to associate detections between measurements. Thus, faster switching can improve the ability to associate measurements. It is further appreciated that, in order to measure Doppler accurately, an automotive radar system needs a coherent set of measurements taken over about 25 ms. Faster switching between antennas means that the scene is more stable and errors associated with changes in the scene are minimized, thereby increasing Doppler accuracy.

Figure 5:
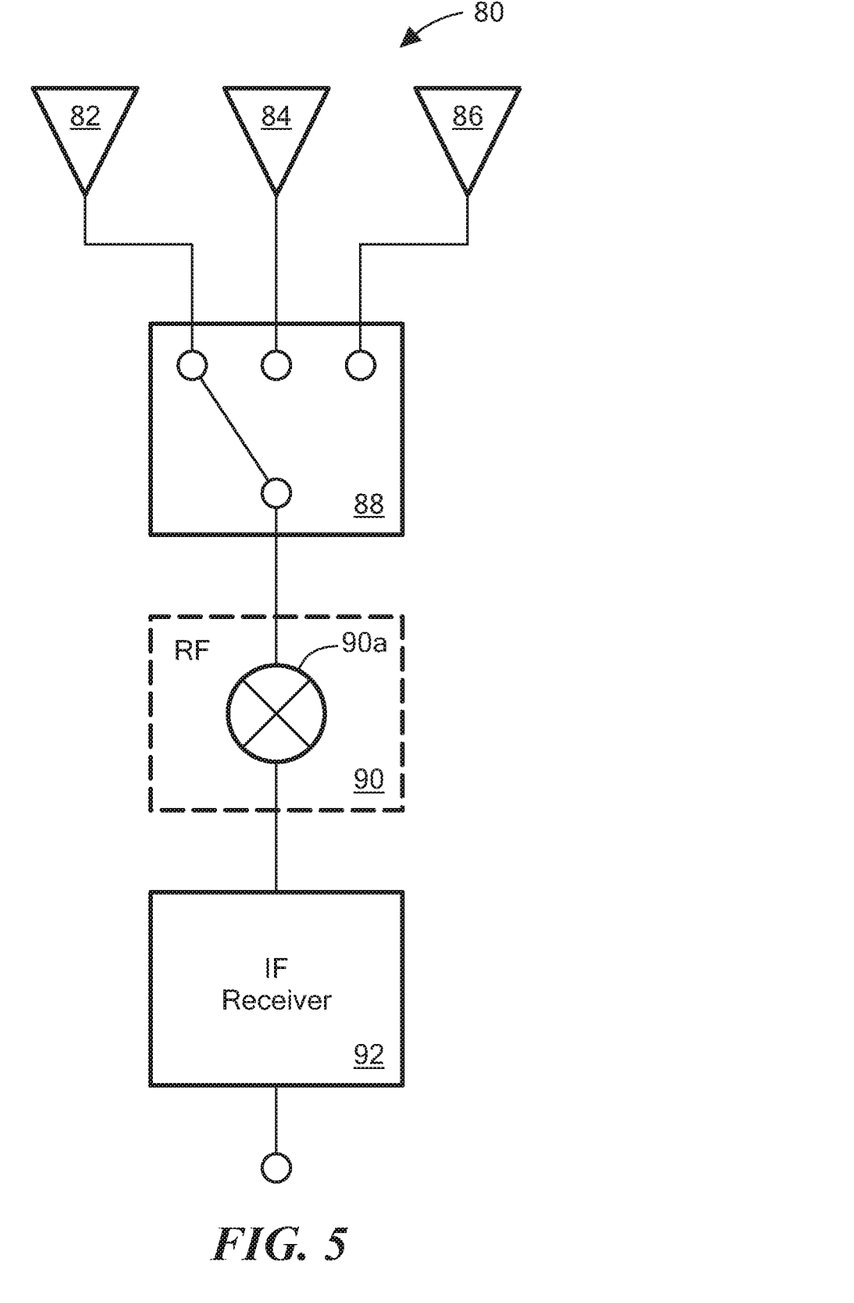
FIGS. 5 and 5A are block diagrams of automotive radar systems having three receive antennas, a single-channel RF receiver, and a single-channel IF receiver.

Referring to FIG. 5, an illustrative radar system 80 suitable for use in various automotive applications includes three receive antennas 82, 84, 86 selectively coupled to a single-channel radio frequency (RF) receiver 90 via a single-pole, three-throw (1P3T) RF switch 88 (sometimes referred to as a (1P3T) or a "3:1" RF switch). Thus, in the example system of FIG. 5, signals received from the three separate antennas 82-86 share the single channel of receiver 90.

The spacing between the receive antennas 82-86 may be selected so as to enable the radar system 80 to resolve azimuth and Doppler using the techniques described herein below. For the purpose of resolving ambiguity, it may be preferable to (in an ideal sense) to have a first antenna 82 spaced from a second antenna 84 by a distance of one-half wavelength (λ/2) and a third antenna 86 spaced from the second antenna 84 by a distance of one wavelength (λ) and spaced from the first antenna 82 by a distance of one and one-half wavelengths (3λ/2). In practice, it may be preferable to space antennas 82, 84 less than one-half wavelength to account for noise on the measurement. Thus, in some embodiments, the second antenna 84 is spaced by a distance of in the range of about 0.4λ to about 0.5λ from the first antenna 82. Also in practice, it may be preferable to space antennas 84, 86 by more than one and one-half wavelengths (3λ/2). In certain embodiments, the third antenna 86 is spaced from the second antenna 84 by a distance of about one wavelength (λ) and spaced from the first antenna 82 by a distance in the range of about 1.4λ to about 1.7λ.

In the example system of FIG. 5, the illustrative RF receiver 90 is show as having an RF downconverter 90a. Those of ordinary skill in the art will appreciate, of course, that an RF receiver may include other components as is generally known (e.g. one or more low noise amplifiers disposed before the down converter 90a). It should also be appreciated that RF switch 88 is not shown as being a proper part of receiver 90. However, those of ordinary skill in the art will appreciate that, in practical systems, RF switch 88 could be provided as part of RF receiver 90.

The RF receiver 90 is coupled to a single-channel IF receiver 92. The IF receiver 92 may include various components as is generally known in the art, including but not limited to an IF filter, an analog-to-digital converter (ADC), and a digital signal processor (DSP).

In operation, the radar system 80 transmits RF signals via a transmit antenna (not shown in FIG. 5). RF energy within the radar beam impinges upon an object (or scene) and RF energy reflected or otherwise redirected by the object back towards the radar 80 is received by receive antennas 82-86. The transmitted RF energy may be in the form of linear frequency modulated continuous wave (FMCW) chirp signals transmitted at regular intervals. For example, in some embodiments, the system 80 transmits chirps approximately every one hundred and seven (107) usec (e.g., eighty-five (85) usec chirps with a twenty-two (22) usec retrace).

Switch 88 provides an RF signal path between respective ones of receive antennas 82-86 and the RF input of receiver 90 at appropriate points in time as will be discussed in further detail below. The single-channel RF receiver 90 receives RF signals provided thereto from respective ones of antennas 82-86 and downconverts the signals to a given intermediate frequency for further processing by the IF receiver 92.

In one illustrative embodiment, the RF switch 88 may be synchronized with the transmitter to selectively cycle through the three antennas 82-86, dwelling on a given receive antenna for the duration of one chirp (i.e. in this illustrative embodiment, the switch couples one of the antennas to the RF receiver for an amount of time corresponding to one chirp). A single progression over the three antennas 82-86 is referred to as a minor cycle. To collect additional data (e.g., data that can be used to obtain an unambiguous measure of azimuth), the radar system 80 may perform several minor cycles, collectively referred to as a major cycle. In some embodiments, the radar system 80 transmits one hundred and ninety-two (192) chirps per major cycle, resulting in sixty-four (64) possible measurements from each antenna. Thus, with eighty-five (85)

usec chirps and a twenty-two (22) usec retrace, the radar system 80 can complete a major cycle approximately every twenty (20) ms.

It should, of course, be appreciated that in other systems a different switching speed or pattern may be used as long as the amount of data (e.g. return signals) received through each antenna 82, 84, 86 is sufficient to allow accurate processing to take place to determine the location of an object with the radar FoV as will be described herein below.

The IF receiver 92 process the signals coupled thereto from RF receiver 90. In various embodiments, the IF receiver 92 receives 192 measurements over a major cycle (e.g., sixty-four (64) chirps for each of the three receive antennas 82-86) and uses these interleaved measurements to determine a location of an object within the radar FoV (e.g. by unambiguously resolving) azimuth and Doppler.

In certain embodiments, the IF receiver 92 performs the following process to resolve unambiguous azimuth and Doppler. In other embodiments, as will be described further below, such processing may be performed by a processor.

Step 1: For each receive antenna 82-86, convert respective analog chirp return signals collected over a major cycle into a set of time-domain samples. Store the time sequence samples in memory for later processing.

Step 2: For each receive antenna 82-86, use a 2D Fast Fourier Transform (FFT) to convert the time-domain samples to the frequency domain to obtain magnitude and phase to target in each range/Doppler bin. Because the system rapidly switches between he receive antennas 82-86, the interleaved measurements from each antenna can be assumed to be of a coherent scene.

Step 3: Correct phase to target based for each receive antenna 82-86. It is noted that the phase to target in each frequency-domain bin depends on the average range (as measured by the specific antenna) over the major cycle. Because the receive antennas 82-86 has different positions (and thus phase shifts to the target) and because movement of the target may cause average phase to change (due to Doppler), it is necessary to shift the phase in proration to chirp time and Doppler.

Step 4: Determine azimuth angle and Doppler using the Doppler corrected phases from the three receive antennas 82-86. Because each antenna takes a measurement of the range and azimuth at a slightly different time and the target moves in range between measurements, there are three measurements (phases) and two unknowns (Doppler and azimuth). Any suitable technical can be used to solve for the two unknowns.

In some embodiments, the three antenna phase measurements can be combined and averaged to reduce the effect of phase noise on the received signals. In particular, if the distance from the target to the antennas is much larger than the antenna spacing, the return signals from the target can be viewed as a "plane wave" where the rays are parallel to each other. The phase seen at each antenna 82-86 is dependent on the antenna position and the angle of arrival. Because the angle of arrival is the same for each antenna 82-86, the three antenna position vs. phase linear relationships can be combined and averaged to reduce the effect of phase noise on the received signals. For example, in some embodiments, three points may be plotted (phase vs. antenna position) and a "best fit" straight line solution through the three points may be found.

It should be understood that the processing steps described above are merely one example and that other implementations may be used to solve for Doppler and azimuth using interleaved measurements from three receive antennas.

As discussed above, a phase curve is the relationship between measured phase difference to a target and actual azimuth angle. Each antenna pair (e.g. antennas 22, 24 as a pair or antennas 22, 26 as a pair) has a unique relationship or phase curve. Assuming a 40 ms major cycle time and a relatively stationary radar scene over 80 ms, for example, one phase curve can be used to resolve the ambiguity of the other. In a multi-channel receiver (e.g., receiver 32 of FIG. 2), phase difference can be calculated using measurements taken simultaneously from multiple different antennas. In a single-channel receiver (e.g., receiver 92 of FIG. 5), a different approach must be taken. In various embodiments, the receiver 92 determines phase difference using measurements taken from multiple different antennas "nearly simultaneously." As used herein, the phrase "nearly simultaneously" means that time between consecutive measurements is significantly less than the time it takes for the scene to change.

As discussed above, ambiguity resolution is preferably done using phase difference measurements at about $\lambda/2$ antenna spacing and at about $3\lambda/2$ antenna spacing. In a single-channel receiver 90, this can be achieved by rapidly switching between the three antennas 82-86 such that nearly simultaneous measurements are taken at antennas 82, 84, and 86. The nearly simultaneous phase information received from all three antennas 82-86 can be used to produce an unambiguous measure of azimuth. In certain embodiments, this is achieved using an illustrative described process show in FIG. 6 and described below in conjunction therewith.

It will be appreciated that the radar system design and related processing techniques described above in conjunction with FIG. 5 offer several advantages. A single-channel RF reduces hardware costs and eliminates the need for precision two-channel tracking, while faster switching allows for unambiguous azimuth measurements.

It will further be appreciated that the disclosed radar system design and processing techniques can be scaled up to greater numbers of antennas (e.g., four (4) or more antennas) without requiring additional RF or IF hardware, so long as switching can be performed sufficiently fast enough. It is appreciated that increasing the spacing between antennas produces greater phase difference for a change in azimuth, which can reduce the effects of phase noise and effects of the vehicle. Using additional antennas allows for increased antenna spacing without introducing ambiguity.

Figure 5A:
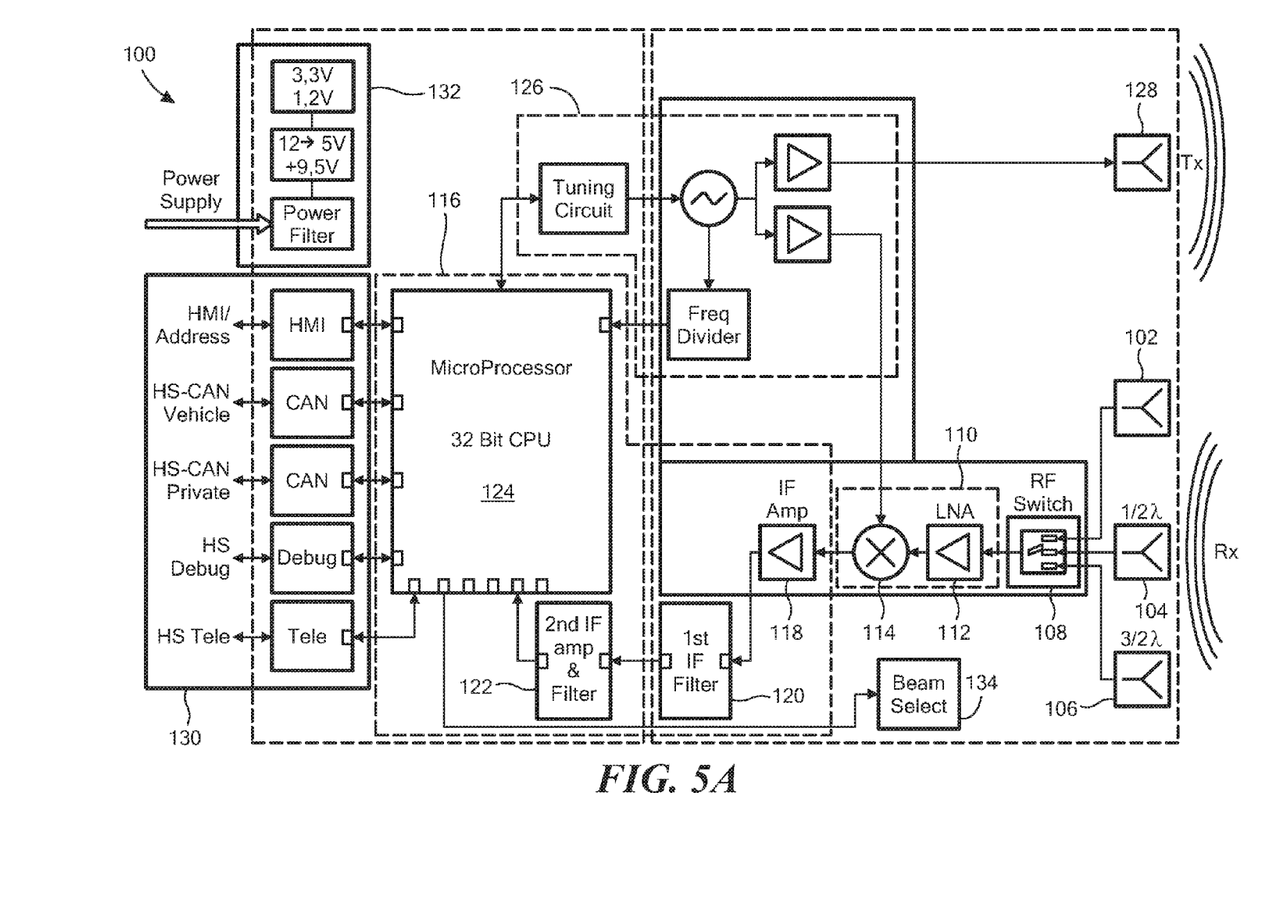

FIG. 5A shows an illustrative radar system 100 that may be the same as or similar to radar system 80 of FIG. 5. The radar system 100 includes receive antennas 102, 104, 106, which may be provided at any suitable spacing as described above in conjunction with FIG. 5. The three antennas 102-106 are selectively coupled to a single-channel radio frequency (RF) receiver 110 via a 3:1 RF switch 108. For improved performance, the switch may be selected to have low loss, to provide switching speed much less than the chirp duration, and to provide isolation greater than 30 dB between channels. In this example, the RF receiver 110 includes an LNA 112 and a downconverter 114. The RF receiver 110 is coupled to a single-channel IF receiver 116 which, in this example, includes an IF amplifier 118, a first IF filter 120, a second IF amplifier 122 (which may be provided in combination with a second IF filter as shown), and a processor 124.

Processor 124 receives the signals provided thereto from the IF receiver and performs the above described processing to compute object detection (e.g. azimuth and Doppler information).

The illustrative radar system 100 also includes transmitter circuitry 126 coupled to the processor 124 and to a transmit antenna 128, as shown. In some embodiments, the radar system 100 may further include input/output ports 130, a power subsystem 132, and/or a beam select 134.

It should be that the radar system 100 shown in FIG. 5A is merely one possible implementation of the generalized radar system design shown in FIG. 5 and described above. Thus, in other implementations, components of the system 100 may be added, removed, and/or combined. For example, it should be appreciated that the processor 124 may include an ADC to digitize the IF signals and a DSP to process the digitized signal. Alternately, an ADC may be provided separate from the processor 124.

Figure 6:
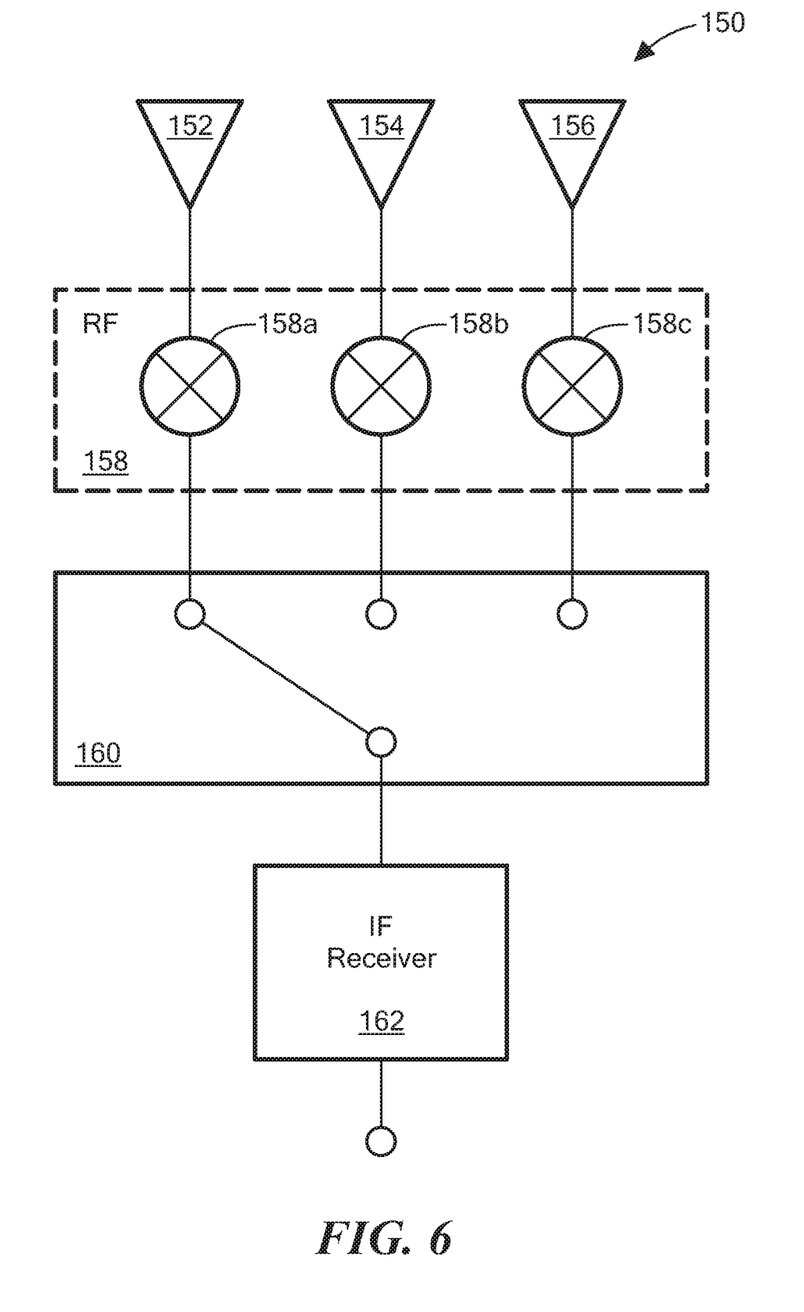
FIGS. 6 and 6A are block diagrams of automotive radar systems having three receive antennas, a three-channel RF receiver, and a single-channel IF receiver.

FIG. 6 shows another automobile radar system design utilizing three receive antennas in combination with a single-channel IF receiver. An illustrative radar system 150 includes a first antenna 152 spaced from a second antenna 154 by a distance of about 0.4λ to about 0.5λ and a third antenna 156 spaced from the second antenna 154 by a distance of about λ and spaced from the first antenna 152 by a distance of about 1.4λ to about 1.7λ. The three antennas 152-156 are coupled to respective channels 158a-158c of a three-channel RF receiver 158. Each of the RF receiver channels 158a-158c has an output selectively coupled to an input of a single-channel IF receiver 162 via a 3:1 IF switch 160. In some embodiments, the receiver includes a standard analog switch 160 with frequency response into the MHz region and channel isolation greater than 30 dB.

Each of the RF receiver channels 158a-158c may be the same as or similar to receiver channel 90a of FIG. 5. Thus, a given RF receiver channel 158a-158c may include an RF downconverter, a low noise amplifier, and/or other components that are generally known.

The single-channel IF receiver 162 may be the same as or similar to IF receiver 92 described above in conjunction with FIG. 5. In particular, the IF receiver 162 may include a processor configured to resolve unambiguous azimuth and Doppler using interleaved measurements from the three receive antennas 152-156 and the techniques described above.

In operation, the three-channel RF receiver 158 simultaneously receives RF signals provided thereto from each of the three receive antennas 152-156. The respective RF channels 158a-158c downconvert the RF signals to generate corresponding IF signals, which are provided as three inputs to the IF switch 160. The IF switch 160 may be synchronized with the transmitter to selectively cycle through the three IF signals, thereby collecting interleaved range and Doppler measurements from the three antennas 152-156. It will be appreciated that the type information collected by the IF receiver 162 in the embodiment of FIG. 6 can be essentially the same as collected by the IF receiver 92 of FIG. 5 and, therefore, the same or similar signal processing techniques can be applied to resolve unambiguous azimuth and Doppler.

Figure 6A:
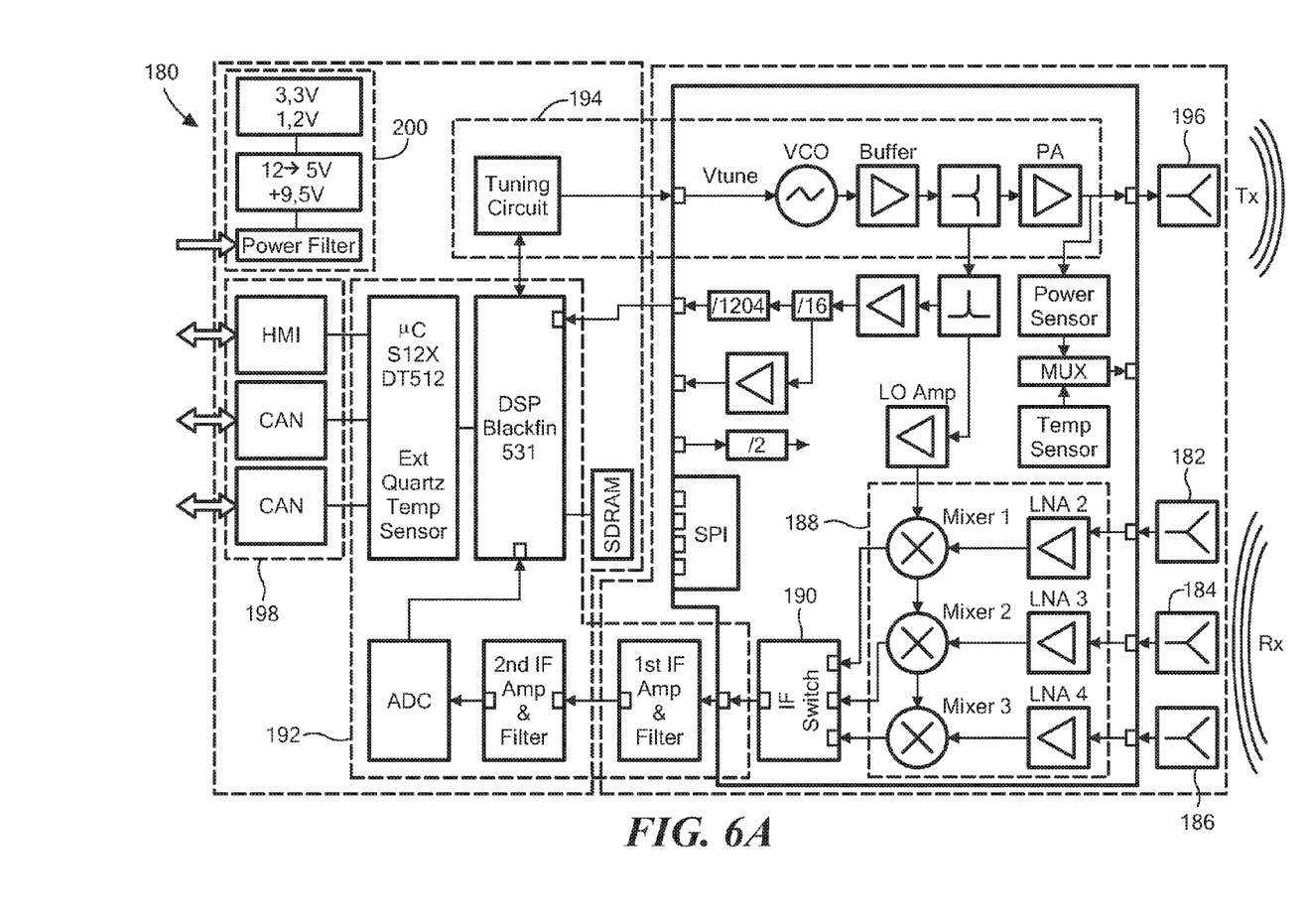

FIG. 6A shows an illustrative radar system 180 that may be the same as or similar to radar system 150 of FIG. 6. The radar system 180 includes a receive antennas 182, 184, 186, which may be spaced as described above in conjunction with FIG. 6. The three antennas 182-186 are coupled to inputs an three-channel RF receiver 188 (here each channel is shown as having an LNA and a downconverter), and outputs of the RF receiver 188 are selectively coupled to an IF receiver 192 via a 3:1 IF switch 190. The IF receiver 192 may include components generally known, such as amplifiers, filters, an ADC, and/or a DSP. In some embodiments, the ADC is capable of operating at 3 MHz. The illustrative radar system 180 also includes transmitter circuitry 194, input/output ports 198, and a power subsystem 200, as shown.

Figure 7:
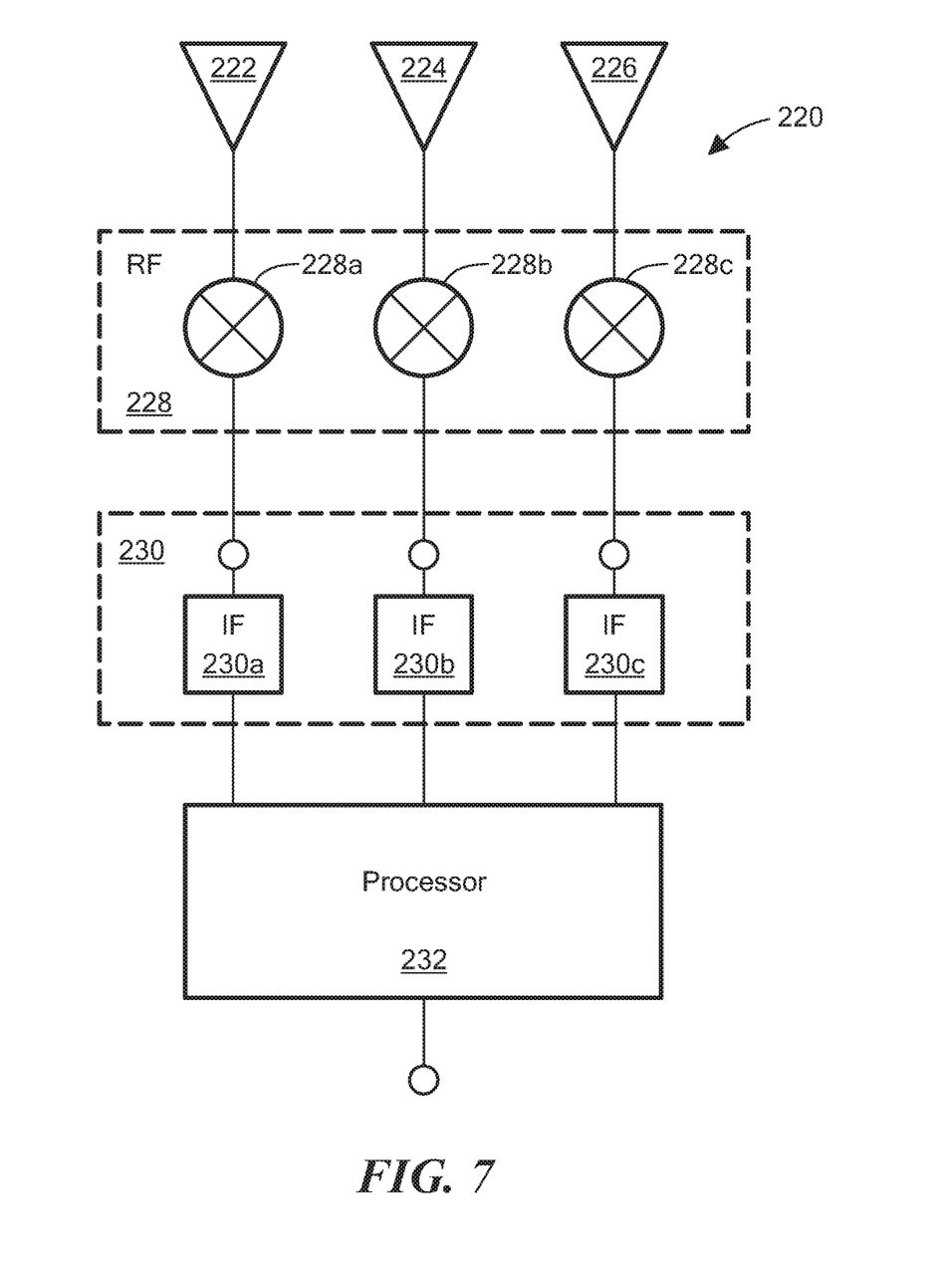
FIG. 7 is a block diagram of an automotive radar system having three receive antennas, a three-channel RF receiver, and a three-channel IF receiver.

FIG. 7 shows an automobile radar system design utilizing three receive antennas in combination with a three-channel IF receiver. An illustrative radar system 220 includes a first antenna 222 spaced from a second antenna 224 by a distance of about 0.4λ to about 0.5λ and a third antenna 226 spaced from the second antenna 224 by a distance of about λ and spaced from the first antenna 222 by a distance of about 1.4λ to about 1.7λ. The three antennas 222-226 are coupled to respective channels 228a-228c of a three-channel RF receiver 228, which are in turn coupled to respective channels 230a-230c of a three-channel IF receiver 230. The output of the IF receiver channels 230a-230c may be provided as input to a processor 232. In some embodiments, the processor 232 is provided as part of the IF receiver 230.

In operation, the three-channel RF receiver 230 simultaneously receives RF signals provided thereto from each of the three receive antennas 222-226. The respective RF channels 228a-228c downconvert the RF signals to generate IF signals, which are fed as inputs to respective ones of the IF channels 230a-230c. The IF channels may perform various IF processing, such as filtering and amplification. The resulting IF signals may be simultaneously received by the processor 232.

The processor 232 may be configured to resolve unambiguous azimuth and Doppler using simultaneous measurements from the three receive antennas 152-156 using techniques similar to those described above in conjunction with FIG. 5. and the techniques described above. It will be understood that providing simultaneous channels simplifies the calculation of azimuth, by eliminating the time shift in separate sampling. It also allows faster measurement cycles.

As will now be apparent from the description provided herein, the concepts, structures and techniques described hereincan benefit any 24 GHz radar, especially those using wide Field of View (FOV) antenna designs. Furthermore, the concepts, structures and techniques described herein can be used in a wide variety of applications including, but not limited to blind spot detection, lane change, CTA, and park slot measurement.

Having described preferred embodiments which serve to illustrate various concepts, structures and techniques, which are the subject of this disclosure, it will now become apparent to those of ordinary skill in the art that other embodiments incorporating these concepts, structures and techniques may be used. For example, it should be noted that individual concepts, features (or elements) and techniques of different embodiments described herein may be combined to form other embodiments not specifically set forth above. Furthermore, various concepts, features (or elements) and techniques, which are described in the context of a single embodiment, may also be provided separately or in any suitable sub-combination. It is thus expected that other embodiments not specifically described herein are also within the scope of the following claims.

Thus, while particular embodiments of the concepts, systems and techniques described herein have been shown and described, it will be apparent to those skilled in the art that various changes and modifications in form and details may be made therein without departing from the spirit and scope of the disclosure as defined by the following claims.

Accordingly, the appended claims encompass within their scope all such changes and modifications.

What is claimed is:
1. An automotive radar system comprising:
three or more receive antennas;
a radio frequency (RF) switch having a three or more input ports coupled to respective ones of the receive antennas, and an output port;

a single-channel RF receiver having an input port coupled to the output of the RF switch to selectively receive RF signals from the receive antennas, and having an output port; and a single-channel intermediate frequency (IF) receiver having an input port coupled to the output port of the RF receiver, wherein the IF receiver is configured to, in response to transmitted chirps reflected off a target, receive interleaved chirp return signals from the receive antennas and to determine an azimuth angle to the target and a Doppler velocity of the target using the interleaved chirp return signals.

2. The automotive radar system of claim 1 wherein the single-channel IF receiver is configured to:

convert interleaved chirp return signals collected over a major cycle into a set of time-domain samples;

for each of the receive antennas, use a 2D Fast Fourier Transform (FFT) to convert the time-domain samples to the frequency domain to obtain magnitude and phase to target in each range/Doppler bin;

for each receive antenna, correct the phase to target in each range/Doppler bin based, at least in part, upon the position of the receive antenna; and determine azimuth angle to the target and a Doppler velocity of the target based upon the corrected phase to target in each range/Doppler bin.

3. The automotive radar system of claim 1 wherein the receive antennas comprise:

a first receive antenna;

a second receive antenna spaced by a distance of in the range of about $0.4\lambda$ to about $0.5\lambda$ from the first antenna; and a third receive antenna spaced from the second antenna by a distance of about $\lambda$ and spaced from the first antenna by a distance in the range of about $1.4\lambda$ to about $1.7\lambda$.

4. The automotive radar system of claim 1 wherein the receive antennas comprise at least four receive antennas.

5. An automotive radar system comprising:

three or more receive antennas;

a radio frequency (RF) receiver having three or more channels, each of the receiver channels having an input port coupled to a respective one of the receive antennas, and an output port;

an intermediate frequency (IF) switch having three or more input ports coupled to respective ones of the RF receiver channel output ports, and having an output port;

a single-channel IF receiver having an input port coupled to the output port of the IF switch to selective receive IF signals from the RF receiver channels, wherein the IF receiver is configured to, in response to transmitted chirps reflected off a target, receive interleaved return signals from the receive antennas and to determine an azimuth angle to the target and a Doppler velocity of the target using the interleaved return signals.

6. The automotive radar system of claim 5 wherein the single-channel IF receiver is configured to:

convert interleaved chirp return signals collected over a major cycle into a set of time-domain samples;

for each of the receive antennas, use a 2D Fast Fourier Transform (FFT) to convert the time-domain samples to the frequency domain to obtain magnitude and phase to target in each range/Doppler bin;

for each receive antenna, correct the phase to target in each range/Doppler bin based, at least in part, upon the position of the receive antenna; and determine azimuth angle to the target and a Doppler velocity of the target based upon the corrected phase to target in each range/Doppler bin.

7. The automotive radar system of claim 5 wherein the receive antennas comprise:

a first receive antenna;

a second receive antenna spaced by a distance of in the range of about $0.4\lambda$ to about $0.5\lambda$ from the first antenna; and a third receive antenna spaced from the second antenna by a distance of about $\lambda$ and spaced from the first antenna by a distance in the range of about $1.4\lambda$ to about $1.7\lambda$.

8. The automotive radar system of claim 5 wherein the receive antennas comprise at least four receive antennas.

* * * * *